E. F. POLAND.
GATE VALVE.
APPLICATION FILED JUNE 12, 1913.
1,074,199.
Patented Sept. 30, 1913.
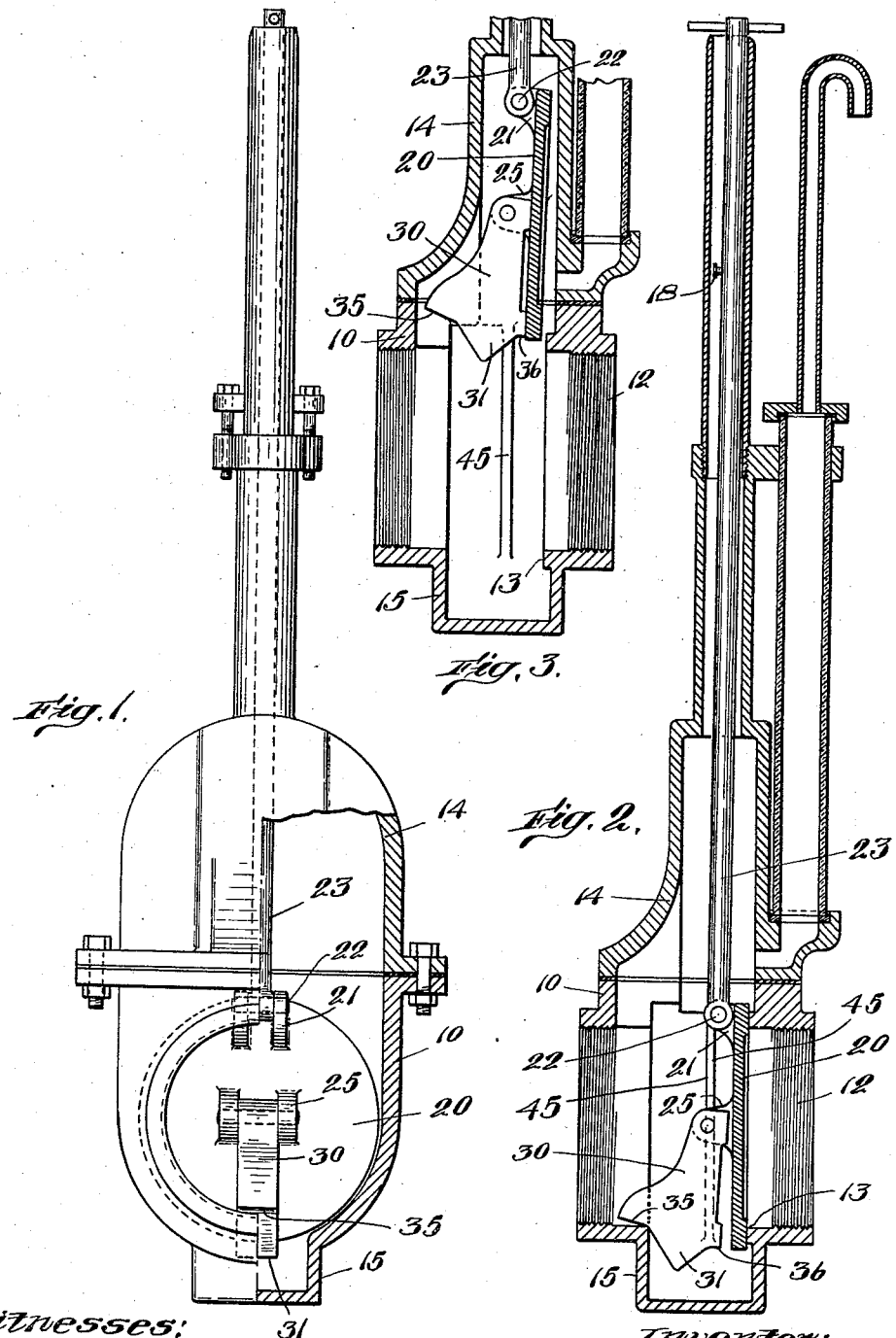
Witnesses:
H. B. Davis,
C. Doyle.
Inventor:
Edward F. Poland
by Amys & Harriman
Attys

UNITED STATES PATENT OFFICE.

EDWARD F. POLAND, OF BOSTON, MASSACHUSETTS.

GATE-VALVE.

1,074,199.  Specification of Letters Patent.  Patented Sept. 30, 1913.

Application filed June 12, 1913. Serial No. 773,212.

*To all whom it may concern:*

Be it known that I, EDWARD F. POLAND, a citizen of the United States, residing at Boston, in the county of Suffolk and State of Massachusetts, have invented an Improvement in Gate-Valves, of which the following is a specification.

This invention relates to gate-valves especially designated for low-pressures and to control a large way, yet it may be otherwise employed.

The invention has for its object to improve and simplify the construction of the valve to the end that it may be easily and cheaply manufactured, and is not liable to get out of order, and may be easily and quickly operated.

The invention consists essentially in certain details of construction of the means employed for moving the valve-plate toward its seat and for holding it in firm engagement with its seat, which is operated upon a downward movement of the valve-rod, assisted by the gravitating action of the valve-plate and valve-rod, said means including a dog which is loosely suspended from the center of the back side of the valve-plate and which has an inclined portion and a shoulder for successively engaging a fixed part of the valve-case, thereby to move the dog bodily inward and then rotatably, to in turn move the valve-plate toward and into engagement with its seat, said means permitting movement of the valve-plate from its seat easily and quickly upon an upward movement of said valve-rod.

Figure 1 is a front elevation of a gate-valve embodying this invention, a part of the wall of the case being broken away. Fig. 2 is a transverse vertical section taken on the dotted line 2—2, Fig. 1, the valve-plate being in closed position. Fig. 3 is a similar transverse vertical section, the valve-plate being in open position.

10 represents a valve-case of any suitable construction having a circular way or passage 12, through it arranged horizontally and provided with a surrounding circular valve-seat 13, and also having an upwardly-extended chambered-portion 14, and a downwardly extended chambered portion 15, the chambers of both portions being in open communication with the passage 12 back of the valve-seat. The valve-plate 20, is of circular form and is adapted to engage the valve-seat 13, and it has an ear 21 on its back side, at the top, through which a pin 22, extends for pivotally or loosely connecting the valve-plate to the lower end of the valve-rod 23. The valve-plate is thus loosely supported and depends from the lower end of the valve-rod and is movable up and down by said rod upon up-and-down movements thereof. The extent of upward movement of the valve-rod is sufficient to enable the plate to be entirely removed from the way 12, and to enter the chamber 14. The valve-plate also has an ear 25 on its back side, which is centrally disposed, and to said ear a dog 30 is pivotally or otherwise loosely connected, and said dog hangs by gravity unless otherwise supported. Said dog is here shown as made of a length approximately equal to the radius of the valve-plate, so that when supported upon the centrally disposed ear 25 its lower end terminates substantially flush with the lower edge of the valve-plate. The lower end of the dog has a projection 31 which is substantially V-shaped and is arranged intermediate its width, and has a shoulder 35 in rear of said projection and has a projection 36 in front of said projection.

The valve-plate is raised by the valve-rod into the position shown in Fig. 3, to open the way, said plate and dog entering the upper chamber 14, and when in this position the valve-plate hangs loosely by gravity from the end of the valve-rod, and is deflected slightly to the left of a vertical plane. Such deflection admits of an up-and-down movement of the valve-plate without said plate engaging its seat. The valve-plate is moved downward by a downward movement of the valve-rod and passes across the way, being guided by the vertical guide-ribs 45, which are arranged at opposite sides of the way, and when said plate reaches its position nearly opposite its seat, but while still moving downward, the rear inclined side of the V-shaped projection 31 engages a fixed part of the case, as for instance, the top of the rear wall of the chambered portion 15, whereupon the dog is moved bodily in a direction toward the right to move the valve-plate toward its seat, and downward and inward movement of the valve-plate then continues until the shoulder 35 of the dog engages a fixed part of the case, as for instance, the top of the rear wall of the chambered portion 15, whereupon downward movement of the dog ceases and a short rotary movement thereof begins by which the valve-plate is caused to move inward toward and into engagement with its seat, the dog acting as a toggle to force the valve-plate against its seat with a thrust depending upon the weight of the valve-plate and valve-rod, if gravity alone is utilized, or with such additional thrust as may be given to it. Thus engagement with a fixed part of the case by the projection and shoulder on the dog are successive. As the dog is moved rotatably on its pivot, its pivotal point is moved in a direction toward the right and the distance between the shoulder 35 and the pivotal connection of the valve-plate with the valve-rod is shortened, hence it will be observed that when the valve-plate is in engagement with its seat it is held by the dog and is substantially detained, as a thrust to move it away from its seat must act to slide it in an upward direction on its seat and lift the rod a short distance owing to the position of the dog and the toggle effect which it exerts when the plate is closed on its seat. Such upward sliding movement is opposed by the weight of the parts, yet is easily accomplished by lifting the valve-rod. The valve-rod extends above the top of the chambered extension 14 of the case and has a cross-bar or other means at its upper end for lifting it, and said rod also has a stud 18 extended from it laterally for engagement with the upper end of the case for the purpose of holding the rod in elevated position.

The valve-rod is made much smaller in diameter than the hole or passage through a pipe-portion of the case through which it extends, so that it is free to move up and down and also laterally in the hole in said pipe-portion, and it is employed without packing of any kind, so that its full weight may be utilized in assisting in closing the valve-plate upon its seat and in holding it on its seat. The lateral movement of the valve-rod is without especial function except that it enables the stud 18 to enter the hole in the pipe-portion without providing a groove to receive it.

At the side of the case a water-gage 50, of any usual or suitable construction is or may be provided, which, as here shown, is connected by an open communicating passage with the valve-case, and said gage is open at the top and has an overflow-pipe 55 extended from it at the top opening in an upward direction to near the top of the pipe-portion of the case, at which point it is turned downward to direct the flow of water downward.

I claim:—

1. In a gate-valve, the combination with a valve-case having a horizontal passage through it with a surrounding valve-seat and having chambers above and below the passage back of said seat, of a valve-plate contained in said case for engagement with said seat having an ear on its back side, at the top, a valve-rod arranged in the case and extended through the upper chamber thereof, which is pivotally connected to said ear, an ear centrally disposed on the back side of said plate, a dog loosely connected to said central ear and depending therefrom, said dog having a projection and a shoulder in rear of said projection for successive engagement with a fixed part of the case, thereby to move the dog inward and then relatively to move the valve-plate in a direction toward its seat upon a downward movement of said plate, substantially as described.

2. In a gate-valve, the combination with a valve-case having a horizontal passage through it with a surrounding valve-seat and having chambers above and below the passage back of said seat, of a valve-rod arranged in the case and extended through the upper chamber thereof, a valve-plate contained in the case for engagement with said seat, said plate being loosely supported at the lower end of the valve-rod and movable up and down by said rod, a dog loosely connected to the back side of said plate having at its lower end a V-shaped projection and a shoulder in rear of said projection for successive engagement with a fixed part of the case, thereby to move said dog inward and then rotatably and in turn move the valve-plate in a direction toward its seat upon a downward movement of said plate, substantially as described.

3. In a gate-valve, the combination with a valve-case having a horizontal passage through it with a surrounding valve-seat and having chambers above and below the passage back of said seat, a valve-rod arranged in the case and extended through the upper chamber thereof, a valve-plate contained in the case for engagement with said seat which is loosely supported at the lower end of the valve-rod and is movable up and down by said rod, a dog pivotally connected to the back side of said plate, at the center thereof, having a projection with an inclined side and a shoulder in rear of said projection for successive engagement with a fixed part of the case, thereby to move the dog bodily inward and subsequently turn it on its pivot to move the valve-plate in a direction toward its seat upon a downward movement of the plate, substantially as described.

4. In a gate-valve, the combination with a valve-case having a horizontal passage through it and a surrounding valve-seat and having chambers above and below the passage back of said seat, a valve-rod arranged in the case and extended through the upper chamber thereof, a valve-plate contained in the case for engagement with said seat, said plate being loosely supported at the lower end of the valve-rod and movable up and down by said rod, a dog pivotally connected to the back side of said plate, at the center thereof, having a projection with an inclined side and a shoulder in rear of said projection for successive engagement with a fixed part of the case, thereby to move the dog inward and rotatably and in turn move the valve-plate in a direction toward its seat upon a downward movement of the valve-plate, the pivotal connection of the dog with the plate being arranged at the front side of a straight line passing through the shoulder and the pivotal connection of the plate with the rod, substantially as described.

5. In a gate-valve, the combination with a valve-case having a horizontal passage through it and a surrounding valve-seat and having chambers above and below the passage back of said seat, and having vertical guide-ribs at the sides of the passage, of a valve-plate contained in the case for engagement with said seat, having an ear on its back side, at the top, a valve-rod arranged in the case and extended through the upper chamber thereof which is pivotally connected with said bar, an ear centrally disposed on the back side of said plate, a dog loosely connected to said ear and depending therefrom, said dog having a projection and a shoulder in rear of the projection for successive engagement with a fixed part of the case, thereby to move the dog inward and then rotatably to move the valve-plate in a direction toward its seat upon a downward movement of said plate, substantially as described.

6. In a gate-valve, the combination with a valve-case having a horizontal passage through it with a surrounding valve seat, of a valve-plate arranged in said case for engagement with said seat, a valve-rod loosely arranged in the case and pivotally connected to said plate, a dog loosely connected to the plate having a projection and a shoulder in rear of said projection for successive engagement with a fixed part of the case, thereby to move the dog inward and then rotatably to move the valve-plate in a direction toward its seat and to close it upon its seat upon a downward movement of said plate and valve-rod due to gravity, substantially as described.

In testimony whereof, I have signed my name to this specification, in the presence of two subscribing witnesses.

EDWARD F. POLAND.

Witnesses:
  H. B. DAVIS,
  B. J. WAYNE.

---

Copies of this patent may be obtained for five cents each, by addressing the "Commissioner of Patents, Washington, D. C."